United States Patent [19]
Green, Jr. et al.

[11] Patent Number: 5,984,352
[45] Date of Patent: Nov. 16, 1999

[54] AIR BAG INFLATOR WITH PRESSURE REGULATION

[75] Inventors: Lloyd G. Green, Jr.; Bradley W. Nelson; Robert E. Scott, all of Mesa; Jess A. Cuevas, Scottsdale; Thomas H. Deming, Mesa, all of Ariz.

[73] Assignee: TRW Inc., Lyndhurst, Ohio

[21] Appl. No.: 09/299,342

[22] Filed: Apr. 26, 1999

[51] Int. Cl.$^6$ .............................. B60R 21/26; B60R 21/28
[52] U.S. Cl. ............................................ 280/736; 280/741
[58] Field of Search .................................... 280/736, 741, 280/742, 740

[56] References Cited

U.S. PATENT DOCUMENTS

| | | | |
|---|---|---|---|
| 3,986,456 | 10/1976 | Doin et al. ............................... | 102/531 |
| 5,056,815 | 10/1991 | Geisreiter ................................. | 280/736 |
| 5,236,675 | 8/1993 | Swain et al. . | |
| 5,851,028 | 12/1998 | Thibodeau ............................... | 280/736 |

FOREIGN PATENT DOCUMENTS 9425315  11/1994  WIPO .

*Primary Examiner*—Lanna Mai
*Assistant Examiner*—Faye M. Fleming
*Attorney, Agent, or Firm*—Tarolli, Sundheim, Covell, Tummino & Szabo L.L.P.

[57] ABSTRACT

An inflator (10) comprises a housing (20) defining a combustion chamber (144). An inflation fluid source (152) in the combustion chamber (144) in the housing (20) is actuatable to provide inflation fluid under pressure. An initiator (94) is provided in the housing (20) for actuating the inflation fluid source (152). The housing (20) has a fluid passage (150) for directing flow of inflation fluid out of the housing. The housing (20) deforms due to the pressure of inflation fluid in the housing upon actuation of the inflation fluid source (152) by the initiator (94). The flow area of the fluid passage (150) increases due to deformation of the housing (20) and varies in accordance with the pressure of inflation fluid in the housing upon actuation of the inflation fluid source (152). The housing (20) comprises first and second housing parts (40, 30) having respective engageable portions (84, 46) that move, upon actuation of the fluid source (152), from a first condition in abutting engagement with each other to a second condition spaced apart from each other to vary the flow area of the fluid passage (150). The first housing part (40) comprises a one-piece metal member that supports the initiator (94) and at least partially defines the combustion chamber (144). The combustion chamber (144) extends around the initiator (94). The one-piece metal member (40) includes a first portion (70) supporting the initiator (94) and defining a radially inner wall of the combustion chamber (144) and a second portion (64) defining a radially outer wall of the combustion chamber.

10 Claims, 4 Drawing Sheets

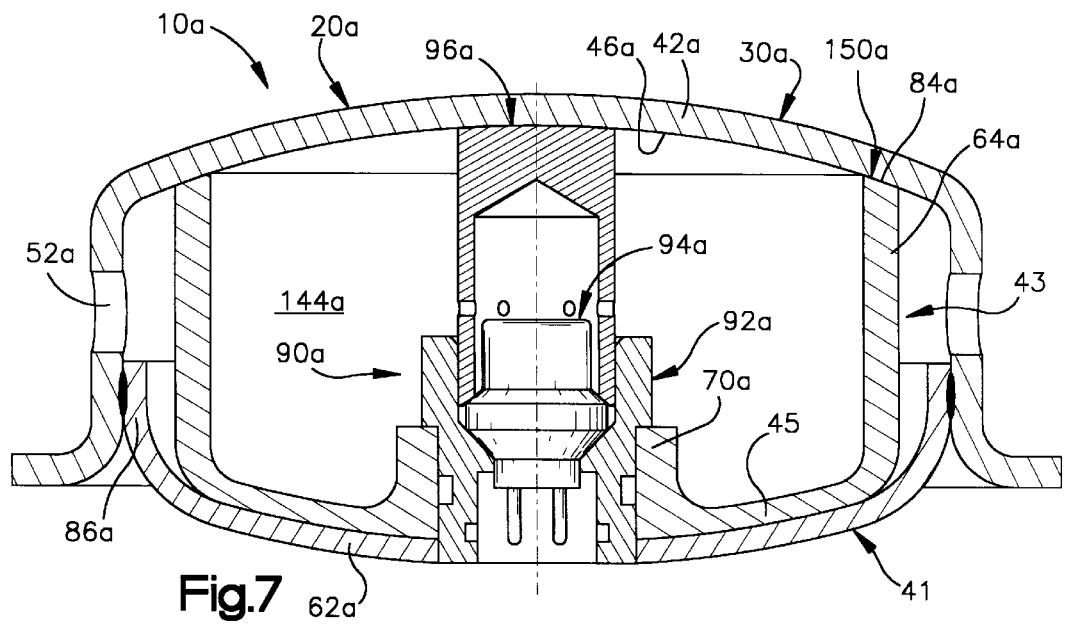
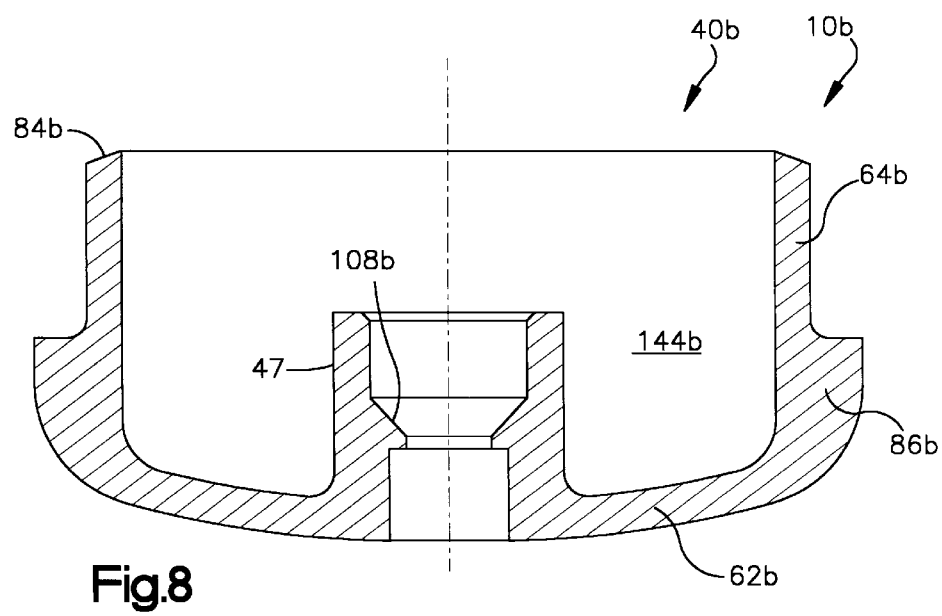

5,984,352

AIR BAG INFLATOR WITH PRESSURE REGULATION

BACKGROUND OF THE INVENTION

1. Technical Field

The present invention relates to an apparatus for inflating an inflatable vehicle occupant protection device.

2. Description of the Prior Art

An inflatable vehicle occupant protection device, such as an air bag, is deployed upon the occurrence of a vehicle crash. The air bag is part of a vehicle occupant protection apparatus which further includes a crash sensor and an inflator. The inflator includes a housing and an inflation fluid source, such as a solid propellant, in the housing. When the crash sensor senses a crash-indicating condition of at least a predetermined threshold level, the inflator is actuated and produces inflation fluid under pressure in the inflator housing. The pressurized inflation fluid is directed out of the inflator housing and inflates the air bag into the vehicle occupant compartment. When the air bag is deployed in this manner, it helps to protect an occupant of the vehicle from a forceful impact with parts of the vehicle as a result of the crash.

When the inflator is actuated at an elevated ambient temperature, the pressure of the inflation fluid in the inflator housing increases. An inflator must be strong enough structurally to contain these elevated pressures. If the pressure in the inflator housing is thus increased, the mass flow rate of the inflation fluid flowing into the air bag can increase above the desired flow rate. Also, the possibility of such increased pressures may make it unfeasible to use a solid propellant which has a high burn rate exponent, that is, a high sensitivity to pressure variation.

SUMMARY OF THE INVENTION

The present invention is an inflator for providing inflation fluid for inflating an inflatable vehicle occupant protection device. The inflator comprises a housing defining a combustion chamber. An inflation fluid source in the combustion chamber in the housing is actuatable to provide inflation fluid under pressure. An initiator is provided in the housing for actuating the inflation fluid source. The housing has a fluid passage for directing flow of inflation fluid out of the housing to the inflatable device. The housing deforms due to the pressure of inflation fluid in the housing upon actuation of the inflation fluid source by the initiator. The flow area of the fluid passage increases due to deformation of the housing and varies in accordance with the pressure of inflation fluid in the housing upon actuation of the inflation fluid source.

The housing comprises first and second housing parts having respective engageable portions that move, upon actuation of the fluid source, from a first condition in abutting engagement with each other to a second condition spaced apart from each other to vary the flow area of the fluid passage. The first housing part comprises a one-piece metal member that supports the initiator and at least partially defines the combustion chamber. The combustion chamber extends around the initiator. The one-piece metal member includes a first portion supporting the initiator and defining a radially inner wall of the combustion chamber and a second portion defining a radially outer wall of the combustion chamber.

BRIEF DESCRIPTION OF THE DRAWINGS

Further features of the present invention will become apparent to those skilled in the art to which the present invention relates from reading the following description with reference to the accompanying drawings, in which:

FIG. 7 is a view of portions of an inflator in accordance with a second embodiment of the invention; and FIG. 8 is a view of portions of an inflator in accordance with a third embodiment of the invention.

DESCRIPTION OF PREFERRED EMBODIMENTS

Figure 1:
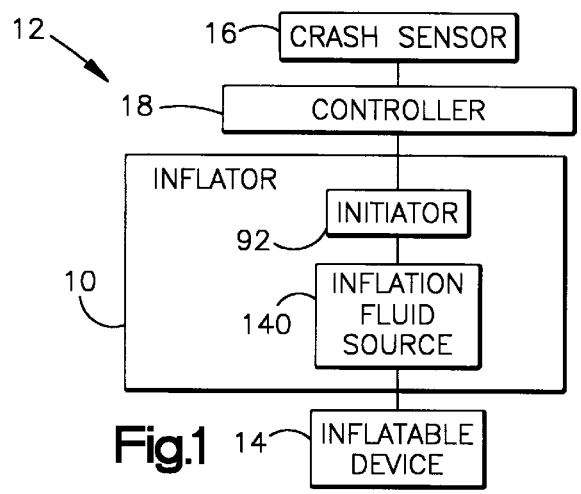
FIG. 1 is a schematic view of a vehicle occupant protection apparatus including an inflator constructed in accordance with a first embodiment of the present invention.

The present invention relates to an apparatus for providing inflation fluid for inflating an inflatable vehicle occupant protection device. As representative of the present invention, FIG. 1 illustrates schematically an inflator 10 which forms part of a vehicle occupant protection apparatus 12.

The apparatus 12 includes an inflatable vehicle occupant protection device 14. In the preferred embodiment of the invention, the protection device 14 is an air bag. Other inflatable vehicle occupant protection devices that can be used in accordance with the present invention include, for example, inflatable seat belts, inflatable knee bolsters, inflatable head liners or side curtains, and knee bolsters operated by inflatable air bags.

The inflator 10 is electrically actuatable to provide inflation fluid for inflating the air bag 14. When the air bag 14 is inflated, it extends into a vehicle occupant compartment (not shown) to help protect a vehicle occupant from a forceful impact with parts of the vehicle as a result of a crash.

The apparatus 12 also includes a crash sensor 16. The crash sensor 16 is a known device which senses a vehicle condition that indicates the occurrence of a crash. If the vehicle condition sensed by the crash sensor 16 is at or above a predetermined threshold level, it indicates the occurrence of a crash having at least a predetermined threshold level of severity. The threshold level of crash severity is a level at which inflation of the air bag 14 is desired for protection of a vehicle occupant.

The vehicle condition sensed by the crash sensor 16 preferably is sudden vehicle deceleration that is caused by a collision. The vehicle condition may, alternatively, be a side impact to the vehicle or a rollover condition of the vehicle. The magnitude and duration of the vehicle deceleration are measured by the crash sensor 16. If the magnitude and duration of the deceleration meet or exceed predetermined threshold levels, they indicate the occurrence of a crash that meets or exceeds the predetermined threshold level of crash severity. A deployment signal is then transmitted to a controller 18 to indicate the occurrence of such a crash. The controller 18 sends an actuation signal to the inflator 10 to actuate the inflator.

Figure 3:
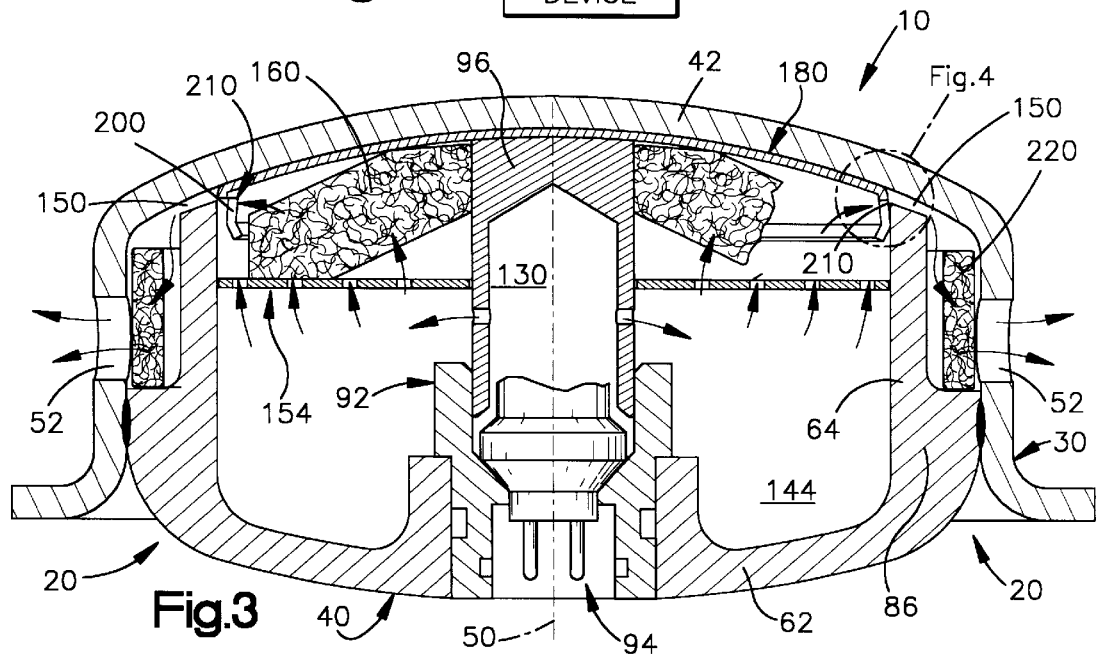
FIG. 3 is a view similar to FIG. 2, showing the inflator in an actuated condition.
Figure 4:
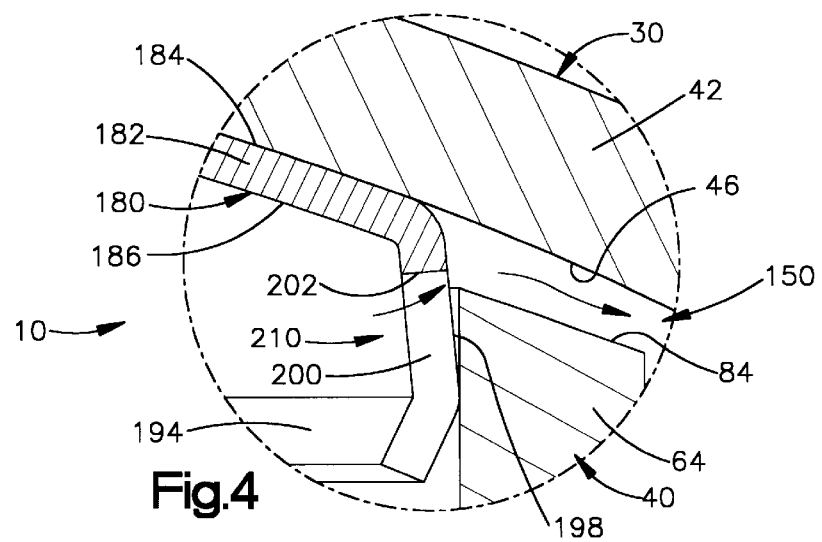
FIG. 4 is an enlarged view of a portion of FIG. 3.

The inflator 10 (FIGS. 2–4) includes a generally cylindrical housing or shell 20. The inflator 10 has a circular configuration as viewed from above in FIG. 2. The housing 20 includes a first or lower (as viewed in FIG. 2) housing part 40, referred to herein as a closure, and a second or upper (as viewed in FIG. 2) housing part 30, referred to herein as a diffuser.

The diffuser 30 has an inverted, cup-shaped configuration including a radially extending end wall 42 and an axially extending side wall 44. The end wall 42 of the diffuser 30 is domed, that is, has a curved configuration projecting away from the closure 40. The end wall 42 has an inner side surface 46.

The side wall 44 of the diffuser 30 has a cylindrical configuration centered on an axis 50 of the inflator 10. A plurality of inflation fluid outlets 52 are disposed in a circular array on the side wall 44. Each one of the inflation fluid outlets 52 extends radially through the side wall 44. The outlets 52 enable flow of inflation fluid out of the inflator 10 to inflate the air bag 14. The outlets 52, as a group, have a fixed, predetermined flow area. An annular inflator mounting flange 54 extends radially outward from the side wall 44 at a location below (as viewed in FIG. 2) the inflation fluid outlets 52.

The closure 40 is a one-piece metal member preferably formed of impacted stainless steel. The closure has a cup-shaped configuration including a radially extending end wall 62 and an axially extending side wall 64. The end wall 62 of the closure 40 is domed, that is, has a curved configuration projecting away from the upper housing part 30. The end wall 62 has an inner side surface 66 presented toward the end wall 42 of the diffuser 30.

The end wall 62 of the closure 40 includes an initiator housing mounting flange 70 which projects axially inward from the end wall 62. The flange 70 has a cylindrical, axially extending inner side surface 72 which defines a circular opening or initiator port 74 in the end wall 62. The initiator port 74 is centered on the axis 50. The flange 70 also has a cylindrical, axially extending, outer side surface 76 which merges with the inner side surface 66 of the end wall 62 of the closure 40. An annular inner end surface 78 on the flange 70 extends radially between the inner and outer side surfaces 72 and 76 of the mounting flange 70.

The side wall 64 of the closure 40 has a cylindrical configuration centered on the axis 50. The side wall 64 has a cylindrical inner side surface 80 which merges with the inner side surface 66 of the end wall 62. The side wall 64 also has a cylindrical outer side surface 82 which extends parallel to the inner side surface 80.

A ring-shaped upper end surface 84 of the side wall 64 extends between the inner and outer side surfaces 80 and 82. The upper end surface 84 has a generally frustoconical configuration and is in abutting engagement with and seals against the inner side surface 46 of the end wall 42 of the upper housing part 30.

Figure 2:
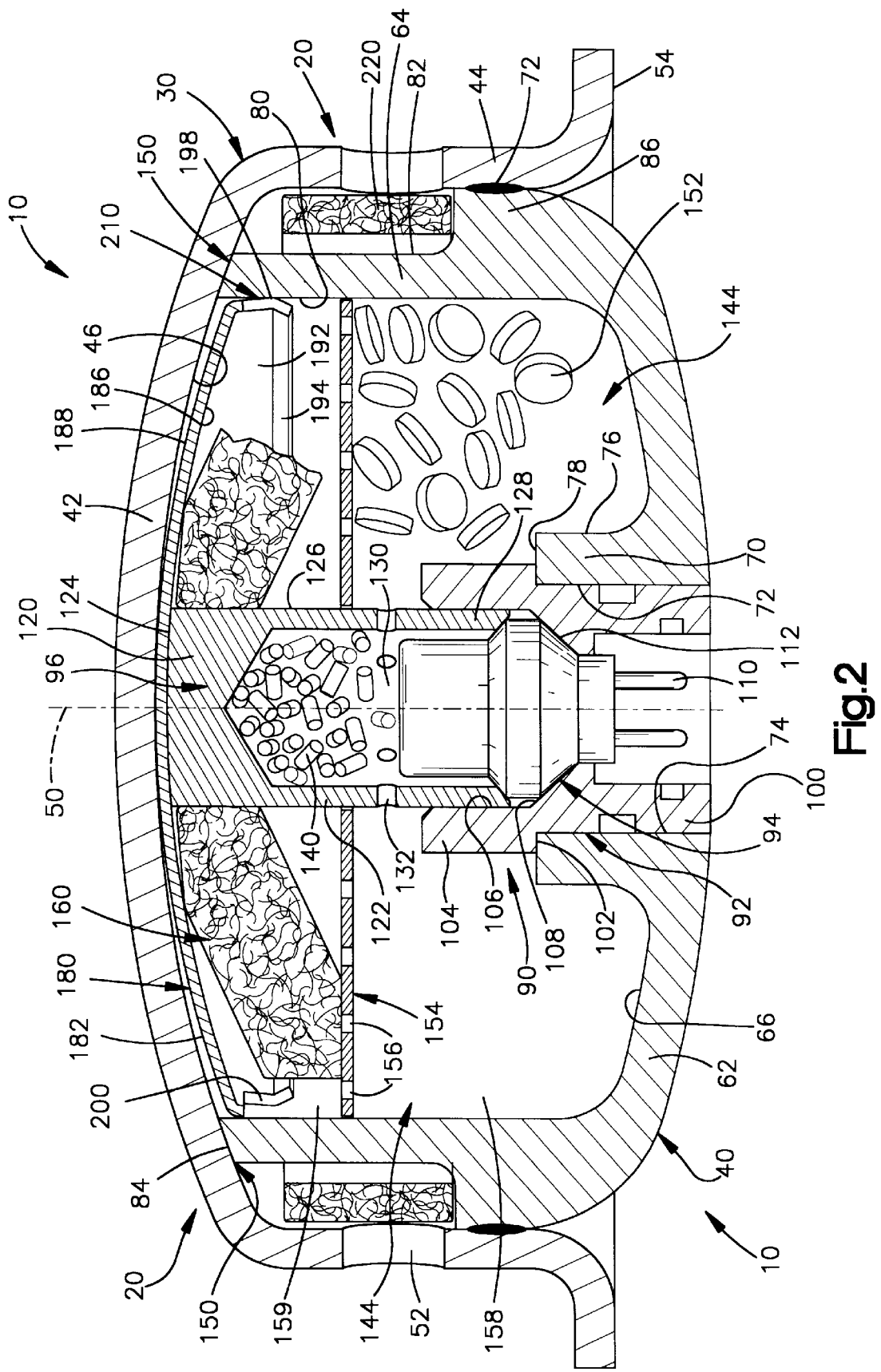
FIG. 2 is a sectional view showing the inflator of FIG. 1 in an unactuated condition.

The portion of the side wall 64 nearest the end wall 62 is radially thicker and forms a filter support shoulder 86. The outer diameter of the filter support shoulder 86 is approximately equal to the inner diameter of the side wall 44 of the diffuser 30. The closure side wall 64, including the filter support shoulder 86, is nested inside the diffuser 30, as seen in FIG. 2. The filter support shoulder 86 of the closure 40 is welded to the side wall 44 of the diffuser 30 with a single, continuous weld 72.

The inflator 10 includes an initiator assembly 90. The initiator assembly 90 includes an initiator housing 92, an initiator 94, and an initiator retainer 96.

The initiator housing 92 has a generally tubular configuration including a lower end portion 100 which is press fit inside the initiator port 74 in the closure 40. A radially extending shoulder surface 102 on the initiator housing 92 engages and is supported on the annular surface 78 on the mounting flange 70. An upper portion 104 of the initiator housing 92 extends axially from the shoulder surface 102 in a direction toward the end wall 42 of the diffuser 30. The upper portion 104 has a cylindrical inner side surface 106. The initiator housing 92 also has a frustoconical internal surface 108 located radially inward of the shoulder surface 102.

The initiator 94 is a known device which is electrically actuatable by an electric current applied through terminals 110 to generate combustion products including heat. The initiator 94 is supported in the initiator housing 92. The initiator 94 has a tapered outer surface 112 which abuts the frustoconical internal surface 108 on the initiator housing 92.

The initiator retainer 96 has an inverted, cup-shaped configuration including a radially extending end wall 120 and a cylindrical, axially extending side wall 122. The end wall 120 has a domed outer end surface 124. The end surface 124 is disposed adjacent to but spaced inwardly from the inner side surface 46 of the end wall 42 of the diffuser 30. The side wall 122 of the initiator retainer 96 has a cylindrical outer side surface 126 which extends parallel to the axis 50. An open end portion 128 of the side wall 122 engages the initiator 94 and is interposed between the initiator and the upper portion 104 of the initiator housing 92.

The initiator retainer 96 has an ignition chamber 130 radially inward of the side wall 122. A circular array of ports or passages 132 is formed in the side wall 122. The passages 132 extend between the ignition chamber 130 and the exterior of the initiator retainer 96. The end wall 120 of the initiator retainer 96 extends across and closes the ignition chamber 130 in the initiator retainer.

An ignition material 140 is located in the ignition chamber 130 of the initiator retainer 96, adjacent to and in contact with the initiator 94. The ignition material 130 is a known material which is ignitable by the initiator 94 and which, when ignited, generates combustion products. One suitable material is boron potassium nitrate, or $BKNO_3$. A known autoignition material is, preferably, commingled with the ignition material 130.

A ring-shaped propellant chamber or combustion chamber 144 is partially defined by the closure 40. The combustion chamber 144 extends around the initiator assembly 90. The radially outer boundary of the combustion chamber 144 is the side wall 64 of the closure 40. The radially inner boundary of the combustion chamber 144 is formed by the side wall 122 of the initiator retainer 96, the upper portion 104 of the initiator housing 92, and the mounting flange 70 of the closure 40.

The upper end surface 84 of the closure side wall 64 and the inner side surface 46 of the diffuser 30 define a fluid passage 150 (FIGS. 2–4) in the inflator 10. Because the closure side wall 64 is cylindrical, the fluid passage 150 has an annular configuration extending around and centered on the axis 50. The fluid passage 150 is located between the combustion chamber 144 and the fluid outlets 52. The fluid passage 150, which is normally closed, opens upon actuation of the inflator 10 as described below.

The inflator 10 includes an actuatable inflation fluid source 152 in the form of a solid propellant. The propellant 152 is located in the combustion chamber 144. The propellant 152 is a known material which is ignitable by the initiator assembly 90 and which, when ignited, produces inflation fluid in the form of gas under pressure for inflating the air bag 14. The propellant 152 is illustrated as being provided in the form of a plurality of small discs. (For clarity in FIG. 2, the propellant discs 152 are not shown in some areas of the combustion chamber 144.) The propellant 152 could, alternatively, be provided in the form of small pellets or tablets, or as large annular discs encircling the initiator assembly 90.

The inflator 10 includes a propellant retainer 154 in the combustion chamber 144. The propellant retainer 154 is a ring-shaped metal plate having a plurality of perforations 156. The propellant retainer 154 is disposed in the combustion chamber 144 and extends radially between the side wall 122 of the initiator retainer 96 and the side wall 64 of the closure 40. The propellant retainer 154 divides the combustion chamber 144 into an annular first part 158, located between the propellant retainer and the closure 40, and an annular second part 159, located between the propellant retainer and the diffuser 30.

The inflator 10 also includes a combustor heat sink 160 in the combustion chamber 144. The heat sink 160 has an annular configuration extending around the side wall 122 of the initiator retainer 96. The heat sink 160 is formed as a knitted stainless steel wire tube which is compressed to the frustoconical shape illustrated in the drawings.

The inflator 10 includes a fluid flow control member in the form of a threshold cap 180. The threshold cap 180 is disposed in the combustion chamber 144, and is located axially between the initiator retainer 96 and the diffuser 30. The threshold cap 180 is made from stamped sheet metal, preferably aluminum, substantially thinner than the housing parts 30 and 40.

Figure 5:
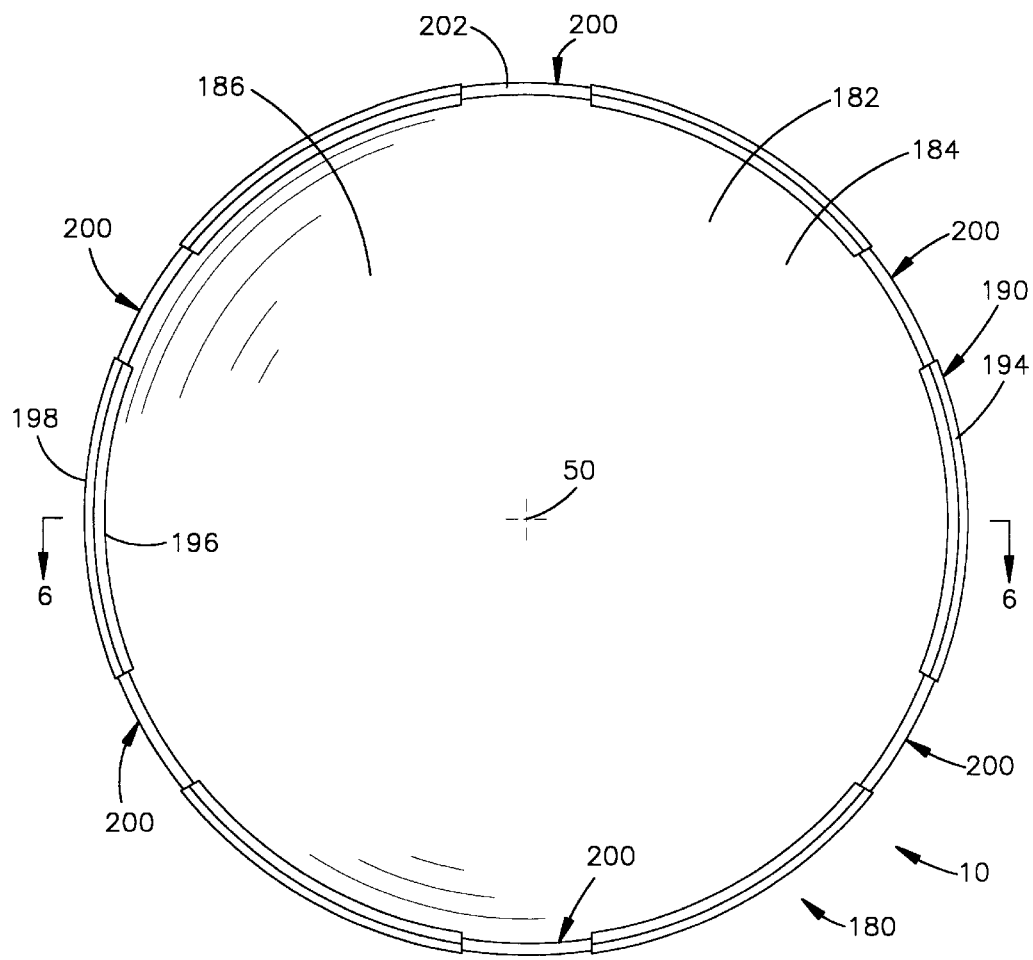
FIG. 5 is a bottom plan view of a threshold cap which forms part of the inflator of FIG. 1.
Figure 6:
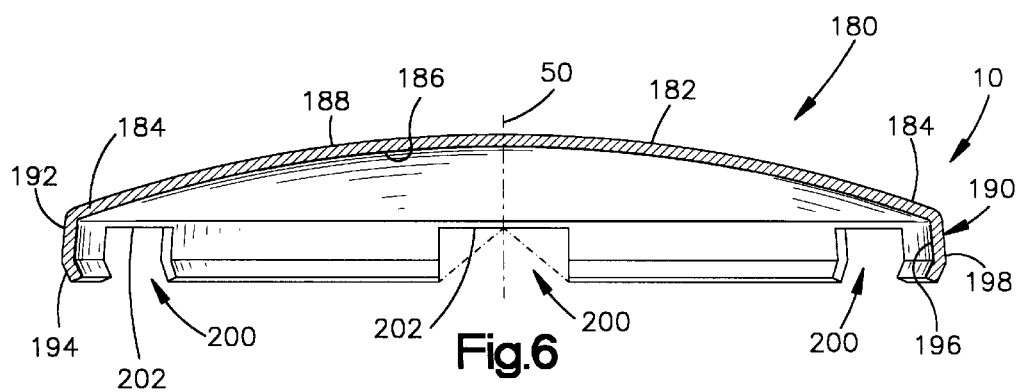
FIG. 6 is a sectional view of the threshold cap taken along line 6—6 of FIG. 5.

The threshold cap 180 (FIGS. 5 and 6) is shaped generally like a throwing disc and has a domed main body portion or central wall 182 centered on the axis 50. The central wall 182 has a circular configuration including an annular outer edge portion 184. The central wall 182 has parallel inner and outer side surfaces 186 and 188.

An annular side wall 190 of the threshold cap 180 extends generally axially from the central wall 182. The side wall 190 of the threshold cap 180 includes a first portion 192 which is connected with and extends from the outer edge portion 184 of the central wall 182 of the threshold cap. The first portion 192 has a slightly frustoconical configuration, extending radially outward from the central wall 182 as it extends axially away from the central wall 182. In the illustrated embodiment, the first portion 192 of the side wall 190 extends at a small angle (about 5 degrees) to the axis 50. A second portion 194 of the side wall 190 of the threshold cap 180 extends axially downward and radially inward from the first portion 192.

The threshold cap 180 has a plurality of openings in the form of slots 200. The slots 200 extend between inner and outer side surfaces 196 and 198 of the side wall 190 of the threshold cap 180. The slots 200 are spaced apart equally along the side wall 190, in a circular array centered on the axis 50. Each one of the slots 200 has a respective upper edge 202.

The slots 200 in the threshold cap 180 together form a fluid flow control passage 210 in the threshold cap. In the illustrated embodiment, the threshold cap 180 has six slots 200. A greater or lesser number of slots 200 may be provided to obtain the desired flow control characteristics of the inflator 10.

The threshold cap 180 (FIG. 2) is disposed in the combustion chamber 144 in the inflator 10, at a location centered on the axis 50. The inner side surface 186 of the central wall 182 of the threshold cap 180 is in abutting engagement with the domed end surface 124 of the end wall 120 of the initiator retainer 96. The outer side surface 188 of the central wall 182 of the threshold cap 180 is in abutting engagement with the inner side surface 46 of the central wall 32 of the diffuser 30.

The threshold cap 180 extends across the entire combustion chamber 144 of the inflator 10. The outer side surface 198 of the side wall 190 of the threshold cap 180 is in abutting engagement with the inner side surface 80 of the side wall 64 of the closure 40, near the fluid passage 150.

The combustor heat sink 160 is compressed axially between the threshold cap 180 and the propellant retainer 154. The combustor heat sink 160 acts as a spring, pressing the propellant retainer 154 against the propellant 152 and restraining the propellant retainer from vibrating. The conical shape of the heat sink 160 makes the heat sink resilient. The resilience of the heat sink 160 eliminates deformation of the parts of the inflator 10 and crushing of the propellant 152 during assembly.

The initiator 94 is trapped or captured axially between the initiator retainer 96 and the initiator housing 92. Specifically, the distance between the end wall 42 of the diffuser 30 and the mounting flange 70 of the closure 40 is selected so that, when the housing parts 30 and 40 are welded together with the initiator assembly 90 inside, the end portion 128 of the initiator retainer side wall 122 presses the initiator 94 against the frustoconical inner surface 108 of the initiator housing 92. The shoulder surface 102 on the initiator housing 92 is pressed axially into engagement with the annular end surface 78 on the mounting flange 70 of the closure 40. The initiator 94 is thus supported, through the initiator housing 92, by the closure 40.

Prior to actuation of the inflator 10, the end surface 84 of the closure side wall 64 seals against the inner side surface 46 of the diffuser end wall 42, so that the fluid passage 150 is closed and has zero flow area. The closed fluid passage 150 blocks fluid flow between the combustion chamber 144 and the fluid outlets 52, prior to actuation of the inflator 10. There is no other path for any significant amount of fluid to flow between the inflation fluid source 152 and the fluid outlets 52. Upon actuation of the inflator 10, as described below, the fluid passage 150 opens to enable inflation fluid to flow between the inflation fluid source 152 and the fluid outlets 52. The fluid passage 150, when open, has a smaller flow area than the fluid outlets 52 in the diffuser 30.

Prior to actuation of the inflator 10, the control passage 210 in the threshold cap 180 is also in a closed condition. The slight angle between the side wall 64 of the closure 40 and the first portion 192 of the side wall 190 of the threshold cap 180 ensures that the slots 200 in the threshold cap are almost completely covered by the side wall of the closure. There is initially no significant gap between the side wall 190 of the threshold cap 180 and the side wall 64 of the closure 40. The threshold cap 180 substantially blocks fluid flow between the combustion chamber 144 and the fluid passage 150. Upon actuation of the inflator 10, as described below, the threshold cap 180 moves and deforms to enable inflation fluid to flow through the slots 200.

In the event of a vehicle crash at or above the predetermined threshold level of crash severity, the inflator 10 is actuated by an electric signal applied to the terminals 110 of the initiator 94. The initiator 94 is energized and ignites the ignition material 140. The ignition material 140 produces combustion products which flow through the passages 132 into the combustion chamber 144, as indicated by the arrows in FIG. 3. The end wall 120 of the initiator retainer 96 blocks flow of the combustion products out of the upper end of the initiator retainer.

The combustion products flowing into the combustion chamber 144 ignite the propellant 152. The propellant 152 combusts and produces inflation fluid under pressure in the combustion chamber 144. The pressure in the combustion chamber 144 rises rapidly to a pressure in the range of about 1,000 psi to about 2,000 psi or more.

The material thickness of the housing 20 is selected so that the end walls 42 and 62 deform because of the pressure of inflation fluid in the housing upon actuation of the inflation fluid source 152. Specifically, the end wall 42 of the diffuser 30 deforms axially outward (in an upward direction as viewed in FIG. 3), from the condition shown in FIG. 2 to the condition shown in FIG. 3. Simultaneously, the end wall 62 of the closure 40 deforms by a small amount axially outward in the opposite direction. The amount of deformation or deflection of the end walls 42 and 62 is dependent on the pressure in the housing 20. That is, the higher the pressure in the housing, the more the end walls 42 and 62 deflect outward.

As the end walls 42 and 62 move away from each other, the fluid pressure on the inner side surface 186 of the threshold cap 180 causes the threshold cap to move with the diffuser end wall 42, away from the closure end wall 62. At the same time, the heat sink 160 and the propellant retainer 154 also move with the diffuser 30, away from the closure 40. This movement of the threshold cap 180 opens the control passage 210, as described below in detail, to enable inflation fluid to flow out of the combustion chamber 144 through the fluid passage 150.

As a result of the deformation of the end walls 42 and 62 of the housing parts 30 and 40, the distance between the end wall of the diffuser and the end wall of the closure increases. The force of the combustion products of the ignition material 140 causes the initiator retainer 96 to move axially, with the threshold cap 180 and the diffuser end wall 42, in a direction away from the closure 40.

When the inflator housing 20 deforms, the end wall 42 of the diffuser 30 moves away from the side wall 64 of the closure 40. The inner side surface 46 of the end wall 42 of the diffuser 30 moves away from the upper end surface 84 of the closure side wall 64. The fluid passage 150 opens and its flow area increases, because of the deformation of the housing 20.

The heat sink 160 cools and filters the inflation fluid flowing out of the combustion chamber 144 through the fluid passage 150. The heat sink 160 also filters particulate matter out of the inflation fluid. The propellant retainer 156 reduces toxic effluent of the combustion process by increasing the completeness of combustion of the propellant 152. It is believed that this occurs because liquid intermediates of the propellant combustion are prevented from embedding in, and being quenched or extinguished by, the heat sink 160.

The inflation fluid flows out of the combustion chamber 144, through the slots 200 in the threshold cap 180, and toward the fluid passage 150. Inflation fluid flows through the fluid passage 150, through a final filter 220 carried on the filter support shoulder 86, and toward the inflation fluid outlets 52. The inflation fluid flows out of the combustion chamber 144 along the entire 360 degree extent of the fluid passage 150. The fluid outlets 52 direct the inflation fluid to flow out of the housing 20 to the inflatable device 14.

The flow area of the fluid passage 150 in the housing 20 varies in accordance with the pressure of inflation fluid in the housing 20. Specifically, the higher the pressure in the housing 20, the more the end walls 42 and 62 deflect or deform outward. The more the end walls 42 and 62 deflect outward, the more the end wall 42 of the diffuser 30 moves away from the end surface 84 of the closure side wall 64, and the bigger the fluid passage 150 becomes. In one embodiment, the fluid passage 150 is typically about one-half millimeter in axial extent when the inflator 10 is actuated. Under extreme pressure conditions, the fluid passage 130 could have an axial extent of as much as two to three millimeters.

As the housing 20 deforms, the slots 200 in the threshold cap 180 progressively open, increasing the flow area of the control passage 210. At the same time, the fluid passage 150 between the diffuser 30 and the side wall 64 of the closure 40 progressively opens. Because the fluid passage 150 has a 360 degree circumferential extent and the slots 200 have a limited circumferential extent, the flow area of the fluid passage 150 increases more rapidly than the flow area of the control passage 210. Thus, the fluid flow area through the slots 200 in the threshold cap 180 almost immediately becomes smaller than the fluid flow area through the fluid passage 150 between the closure 40 and the diffuser 30. Thus, the threshold cap 180 acts as a restrictor, or control, for the rate of fluid flow out of the inflator 10.

The flow area of the slots 200 in the threshold cap 180, which make up the control passage 210, also varies in accordance with the pressure of inflation fluid in the housing 20. Specifically, the higher the pressure in the housing 20, the more the threshold cap 180 moves away from the closure 40. In addition, the outer edge portion 184 of the central wall 182 of the threshold cap 180 flattens against the end wall 32 of the diffuser 30. As a result, a greater portion of each one of the slots 200 in the threshold cap 180 is exposed, and the control passage 210 becomes bigger.

Because the flow area of the control passage 210 varies in accordance with the pressure of inflation fluid in the housing 20, the internal operating pressure of the inflator 10 is self-regulating. Any increased pressure in the combustion chamber 144 causes the control passage 210 to open further, thus allowing the pressure to be relieved and lowered. The range of peak operating pressures in the inflator 10 is, therefore, narrowed, reducing the structural requirements of the inflator housing 20 accordingly.

Controlling fluid flow in this manner, that is, through movement of the slotted threshold cap 180, is more precise than controlling fluid flow with the gap 150 between the two deforming housing parts 30 and 40. In addition, it is relatively easy to vary the fluid flow characteristics for different inflators, by providing different threshold caps 180 having different opening sizes or configurations.

Because the peak pressures in the combustion chamber 144 are reduced by the increased opening of the variable control passage 210, effects of temperature change on the pressure in the combustion chamber are minimized. This can enable the use of a propellant 152 which is more pressure sensitive, that is, which has a higher burn rate exponent.

FIG. 7 illustrates portions of an inflator 10a in accordance with a second embodiment of the invention. The inflator 10a is generally similar in construction and operation to the inflator 10, and parts which are the same or similar are given the same reference numerals with the suffix "a" attached.

The major difference between the inflator 10 and the inflator 10a is that the first housing part 40 of the inflator 10, which is formed as one piece, is replaced in the inflator 10a by two separate pieces, a closure 41 and a combustion cup 43.

The combustion cup 43 is a one-piece, cup-shaped member which includes an initiator mounting flange 70a and an outer side wall 64a joined by an end wall 45. The outer side wall 64a includes an annular, frustoconical end surface 84a which is engageable with the inner side surface 46a of the diffuser end wall 42a.

The closure 41 is a one-piece, bowl-shaped member which has a radially extending end wall 62a and an axially extending side wall 86a. The side wall 86a of the closure 41 is welded to the diffuser 30a.

The end wall 62a of the closure 41 supports the combustion cup 43. The combustion cup 43 is trapped or captured axially between the diffuser 30a and the closure 41. The initiator assembly 90a is trapped or captured axially between the diffuser 30a and the combustion cup 43. Upon actuation of the inflator 10a, the combustion cup 43 and the closure 41 move as one away from the diffuser 30a, opening the fluid passage 150a.

FIG. 8 illustrates a first housing part or closure 40b of an inflator 10b in accordance with a second embodiment of the invention. The closure 40b of the inflator 10b is generally similar in construction and operation to the housing part 40 of the inflator 10, and portions which are the same or similar are given the same reference numerals with the suffix "b" attached. The parts of the inflator 10b which are not shown are similar in construction and operation to the corresponding parts of the inflator 10.

The closure 40b is, unlike the closure 40, designed to accept and support only the specific type of initiator shown in the first embodiment of the invention. Thus, the closure 40b has an integral initiator mounting portion 47 including internal frustoconical surface 108b. No separate initiator support is needed (like the initiator support 92 (FIGS. 1–6)). The closure 40b thus eliminates the separate initiator support. The closure 40b can only accept this one type of initiator, however, and does not have a "universal" initiator port as does the closure 40 (FIGS. 1–6), which can accept a plurality of different initiator supports and thus a plurality of different initiators.

From the above description of the invention, those skilled in the art will perceive improvements, changes and modifications in the invention. For example, the slots 200 may have a configuration different from the rectangular configuration illustrated. Specifically, each slot 200 may have a triangular configuration, as illustrated in dot-dash lines in FIG. 6, including an apex near the central wall 182 of the threshold cap 180 and a wide base at the edge of the side wall portion 194 of the threshold cap. This slot configuration provides a non-linear increase in fluid flow through the slots as the threshold cap 180 moves relative to the closure 40. The non-linear flow can help to counteract the effects of ambient temperature on the output of the inflator 10. Specifically, when the inflator 10 is cold, the propellant 152 burns more slowly, and the pressure in the inflator increases more slowly. In that case, it is desired that the fluid outlet area of the inflator 10 be relatively small at first. The relatively small flow area provided when the triangular slots open only partially can help to provide this result. On the other hand, when the inflator 10 is hot, the propellant 152 burns more rapidly, and the pressure in the inflator increases more rapidly. In that case, it is desired that the fluid outlet area of the inflator 10 be relatively large. The relatively large flow area provided when the triangular slots open more completely can help to provide this result. Such improvements, changes and modifications within the skill of the art are intended to be covered by the appended claims.

Having described the invention, we claim:

1. An inflator for providing inflation fluid for inflating an inflatable vehicle occupant protection device, said inflator comprising:

a housing defining a combustion chamber;

an inflation fluid source in said combustion chamber in said housing and actuatable to provide inflation fluid under pressure; and an initiator in said housing for actuating said inflation fluid source;

said housing having a fluid passage for directing flow of inflation fluid out of said housing to the inflatable device;

said housing deforming due to the pressure of inflation fluid in said housing upon actuation of said inflation fluid source by said initiator;

the flow area of said fluid passage increasing due to deformation of said housing and varying in accordance with the pressure of inflation fluid in said housing upon actuation of said inflation fluid source;

said housing comprising first and second housing parts having respective engageable portions that move, upon actuation of said fluid source, from a first condition in abutting engagement with each other to a second condition spaced apart from each other to vary the flow area of said fluid passage;

said first housing part comprising a one-piece metal member that supports said initiator and at least partially defines said combustion chamber, said combustion chamber extending around said initiator, said one-piece metal member including a first portion supporting said initiator and defining a radially inner wall of said combustion chamber and a second portion defining a radially outer wall of said combustion chamber.

2. An inflator as set forth in claim 1 wherein said one-piece member comprises a third portion joining said first and second portions and defining an axial end wall of said combustion chamber.

3. An inflator as set forth in claim 2 comprising an initiator retainer supported in said first housing part and captured axially between said first housing part and said second housing part.

4. An inflator as set forth in claim 3 wherein said initiator retainer supports said initiator in said housing and contains an ignition material for helping to actuate said inflation fluid source.

5. An inflator as set forth in claim 1 wherein said second portion of said one-piece metal member includes said engageable portion of said first housing part.

6. An inflator as set forth in claim 1 wherein said engageable portion of said first housing part comprises an annular surface on said first housing part which is engageable with an inner major side surface of said second housing part.

7. An inflator for providing inflation fluid for inflating an inflatable vehicle occupant protection device, said inflator comprising:

a housing defining a combustion chamber;

an inflation fluid source in said combustion chamber in said housing and actuatable to provide inflation fluid under pressure;

an initiator in said housing for actuating said inflation fluid source;

said housing having a fluid passage for directing flow of inflation fluid out of said housing to the inflatable device;

said housing deforming due to the pressure of inflation fluid in said housing upon actuation of said inflation fluid source by said initiator;

the flow area of said fluid passage increasing due to deformation of said housing and varying in accordance with the pressure of inflation fluid in said housing upon actuation of said inflation fluid source;

said housing comprising first and second housing parts having respective engageable portions that move, upon actuation of said fluid source, from a first condition in abutting engagement with each other to a second condition spaced apart from each other to vary the flow area of said fluid passage;

said first housing part comprising a one-piece metal member that supports said initiator and defines said combustion chamber, said combustion chamber extending around said initiator; and a flow control member defining a control passage located between said inflation fluid source and said fluid passage, said control passage having a smaller flow area than said fluid passage, the flow area of said control passage increasing due to deformation of said housing and varying in accordance with the pressure of inflation fluid in said housing upon actuation of said inflation fluid source.

8. An inflator as set forth in claim 7 wherein said control passage comprises a plurality of fluid flow control openings which move relative to said housing to increase their flow area upon deformation of said housing.

9. An inflator as set forth in claim 8 wherein said fluid flow control openings have a non-linear configuration.

10. An inflator as set forth in claim 7 wherein said flow control member comprises a disc-shaped sheet metal member having a thickness substantially less than the thickness of said first and second housing parts.

* * * * *